(No Model.)
W. S. JOHNSON.
PIPE COUPLING.
No. 502,671. Patented Aug. 1, 1893.
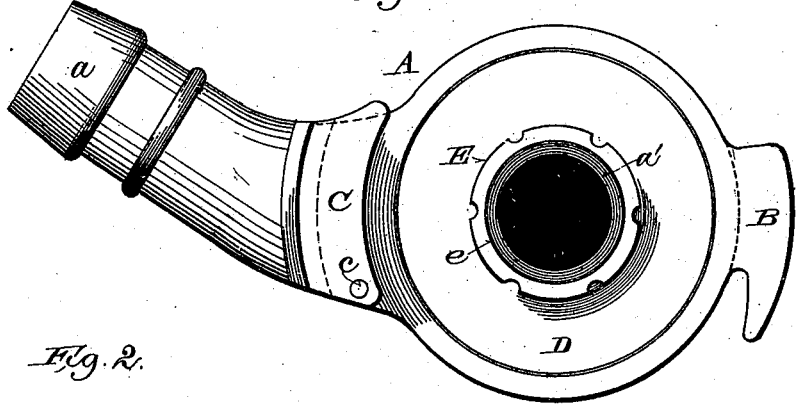
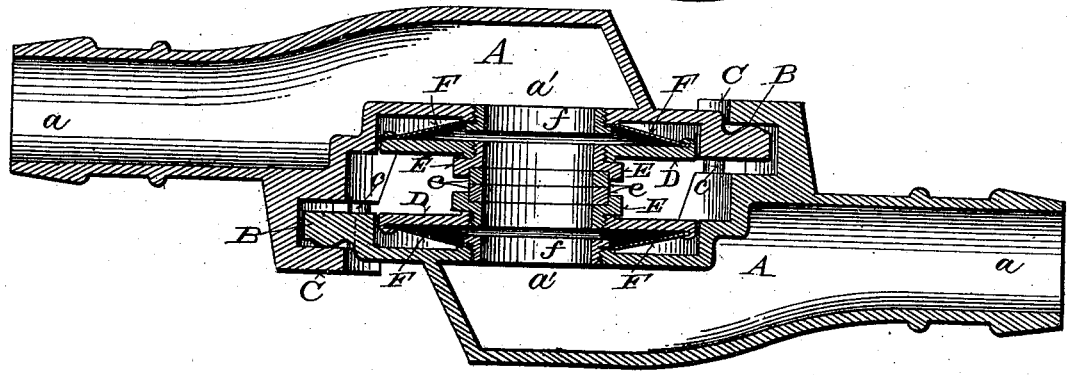
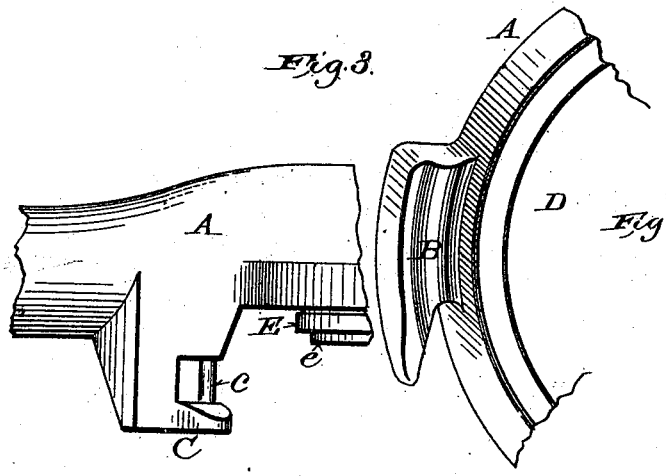
Witnesses:
Inventor:
Warren S. Johnson,
By Bond... Attorneys.

UNITED STATES PATENT OFFICE.

WARREN S. JOHNSON, OF MILWAUKEE, WISCONSIN, ASSIGNOR TO THE JOHNSON ELECTRIC SERVICE COMPANY, OF SAME PLACE.

PIPE-COUPLING.

SPECIFICATION forming part of Letters Patent No. 502,671, dated August 1, 1893.

Application filed July 8, 1892. Serial No. 439,324. (No model.)

*To all whom it may concern:*

Be it known that I, WARREN S. JOHNSON, of Milwaukee, in the county of Milwaukee and State of Wisconsin, have invented certain new and useful Improvements in Pipe-Couplings; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to secure a tight joint between the members of the coupling, to utilize the internal pressure within the coupling to force and hold the bearing surfaces or packing rings together, to dispense with springs and complicated fastening devices, and generally to simplify and improve the coupling.

It consists essentially of the combination with a chamber or hollow body having an opening in one side or face, of a perforated diaphragm and a perforated plate attached to each other at or near their outer edges, one being attached to said chamber and the other provided with a bearing ring or surface, and of certain other peculiarities of construction and arrangement hereinafter particularly described and pointed out in the claims.

In the accompanying drawings like letters designate the same parts in the several figures.

Figure 1 is a side elevation of one member of my improved coupling. Fig. 2 is a longitudinal horizontal section of the two members of the coupling connected. Fig. 3 is a plan view of a portion of one member, showing the female lug for connecting it with the other, and Fig. 4 is a perspective view of the male lug or hook, which is adapted to engage with the female lug for holding the members of the coupling together.

A A are the two members of the coupling, formed with necks $a\, a$, for the attachment of the pipe or hose sections which they are designed to connect, and in their adjacent meeting faces with corresponding openings $a'\, a'$. Each member of the coupling is preferably formed around the opening $a'$ therein with an annular recess, and on one side of said recess with a hook or male lug B, and on the opposite side with a female lug C, which are adapted to interlock with corresponding lugs on the other member of the coupling and thereby hold the members together in the proper relation with each other. These lugs are located in different planes on each member, and are preferably of segment shape so as to permit of their engagement by turning one member of the coupling upon the other. Cross pins $c\, c$ are secured in the lower ends of the recesses in the female lugs C, in position to be engaged by the hooks of the male lugs B when the members of the coupling are connected and said lugs are interlocked.

D D are rigid perforated face plates loosely inserted in the recesses formed therefor around the apertures $a'\, a'$ in the members A A. They are provided on the outside around the openings therein, with annular bearing surfaces which preferably consist of washers or gaskets $e\, e$, of vulcanized fiber or other suitable packing material held in annular recesses in the outer ends of rings E E, which are screwed into the openings in said plates, as shown in Fig. 2.

F F are perforated flexible diaphragms, which may be conveniently made of thin sheet metal interposed between the members A A and the face plates D D, to which they are secured at their outer edges by spinning the edges of the face plates over them, as shown, or by any other suitable means. At their inner edges around the openings therein, they are secured to the members A A around the apertures $a'\, a'$ therein, by flanged rings $f f$, screwed into said apertures. These diaphragms are constructed and arranged to flare outwardly from the adjacent faces of the members A A, to which they are attached, and by their elasticity hold the washers $e\, e$ together when the members of the coupling are connected and before they are subjected to internal pressure. The face plates D D at their edges on the backs where they are spun over the edges of the diaphragms F F, project sufficiently to strike against the adjacent faces of the members A A when they are forced inwardly and thereby prevent the diaphragms F F from being sprung at their outer edges inwardly beyond the plane of their inner edges around the apertures $a'$ $a'$.

In this way extra springs for holding the face plates and their bearing surfaces or washers $e$ $e$ outwardly in operative position, are rendered unnecessary, the elasticity of the diaphragms being sufficient to hold them in such position whenever the coupling is not subjected to the internal pressure, which acting on the inner surfaces of the face plates D D, force them outwardly and hold the washers $e$ $e$ tightly together.

By the mode hereinbefore described of attaching the bearing surfaces or washers $e$ $e$ to the members of the coupling, they are permitted to oscillate and to adjust themselves readily to each other so as to bear with uniform pressure against each other on all sides and produce a perfectly tight joint between them.

Various changes in the details of construction and arrangement may be made within the spirit and intended scope of my invention.

Although two members constructed alike are designed to be used together as herein shown, the use of one such member in connection with another of different construction but having an opening and bearing face corresponding with that of the face plate, is perfectly feasible and is contemplated.

I claim—

1. In a pipe coupling a member having an aperture in one side, a perforated face plate larger than said aperture, and a diaphragm interposed between said member and face plate and attached at its inner edge to said member and at its outer edge to said face plate, whereby an expansible space is produced between said diaphragm and face plate, substantially as and for the purposes set forth.

2. A pipe coupling comprising two members having apertures in their meeting faces, perforated face plates provided around the openings therein with bearing surfaces, and diaphragms interposed between said face plates and members and attached at their inner edges to said members and at their outer edges to said face plates, whereby an expansible space is produced between said diaphragms and face plates, substantially as and for the purposes set forth.

3. A pipe coupling, comprising two members having apertures in their meeting faces and annular recesses around said apertures, perforated face plates provided with packing rings around the openings therein and loosely inserted in the recesses in the meeting faces of said members, and perforated flexible diaphragms interposed between said face plates and members and attached at their inner edges to said members around the apertures therein, and at their outer edges to said face plates, substantially as and for the purposes set forth.

4. A pipe coupling, comprising two members having apertures in their meeting faces, perforated face plates provided with outwardly projecting bearing surfaces around the openings therein, perforated flexible diaphragms interposed between said face plates and members, secured at their inner edges to said members by flanged rings screwed into the apertures therein and attached at their outer edges to said face plates by spinning the outer edges of said face plates over them, substantially as and for the purposes set forth.

5. A pipe coupling, comprising two members having apertures in their meeting faces, perforated face plates provided around the openings therein with outwardly projecting bearing surfaces and perforated flexible diaphragms interposed between said face plates and members, to which they are attached at their inner edges around the apertures therein, flaring outwardly from said apertures and attached at their outer edges to said face plates, substantially as and for the purposes set forth.

6. A pipe coupling, comprising two members having apertures in their meeting faces and provided on opposite sides thereof with interlocking male and female lugs, peforated face plates provided around the openings therein with outwardly projecting bearing surfaces and perforated flexible diaphragms interposed between said face plates and members and attached at their inner edges to said members around the apertures therein, and at their outer edges to said face plates, substantially as and for the purposes set forth.

7. A pipe coupling, comprising two members A A, having apertures $a'$ $a'$ in their meeting faces and provided with interlocking lugs B and C, perforated face plates D D and perforated flexible diaphragms F F interposed between said face plates and members and attached at their inner edges to said members and at their outer edges to said face plates, substantially as and for the purposes set forth.

8. In a pipe coupling, a member having an aperture in one side, a perforated face plate having a bearing surface on the outside around the opening therein, and a perforated flexible diaphragm attached at its outer edge to said face plate and at its inner edge to the member around the aperture therein, substantially as and for the purposes set forth.

9. In a pipe coupling the combination with a chambered member having an opening in one face and a bearing ring, of a perforated diaphragm and a perforated plate attached to each other at their outer edges, whereby an expansible space is produced between them, and attached at their inner edges, one to said member around the opening therein, and the other to said bearing ring, substantially as and for the purposes set forth.

10. In a pipe coupling, the combination with a hollow member having an opening in one face, of a perforated flexible diaphragm and a perforated plate attached to each other at or near their outer edges, whereby an expansible space is produced between them, one being attached at its inner edge to said member around the opening therein, and the other being provided around the opening therein with an external bearing, substantially as and for the purposes set forth.

In testimony that I claim the foregoing as my own I affix my signature in presence of two witnesses.

WARREN S. JOHNSON.

Witnesses:
 CHAS. L. GOSS,
 E. C. ASMUS.